Sept. 21, 1943.   E. WILDHABER   2,329,804
CUTTER FOR PRODUCING GEARS
Filed May 23, 1940   2 Sheets-Sheet 1

Inventor
ERNEST WILDHABER
By [signature]
Attorney

Sept. 21, 1943.     E. WILDHABER     2,329,804
CUTTER FOR PRODUCING GEARS
Filed May 23, 1940     2 Sheets-Sheet 2
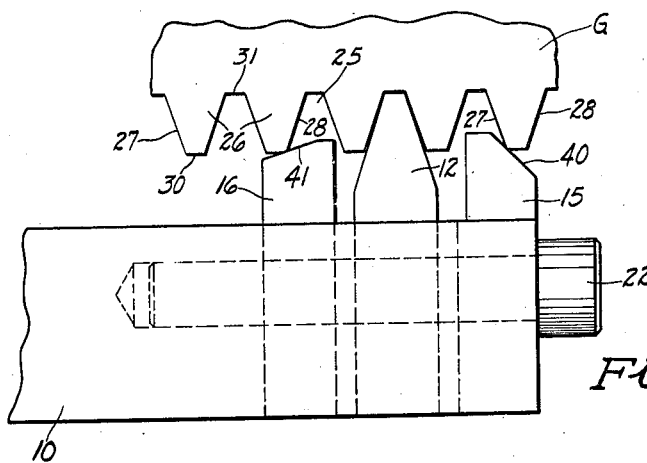
Fig. 2
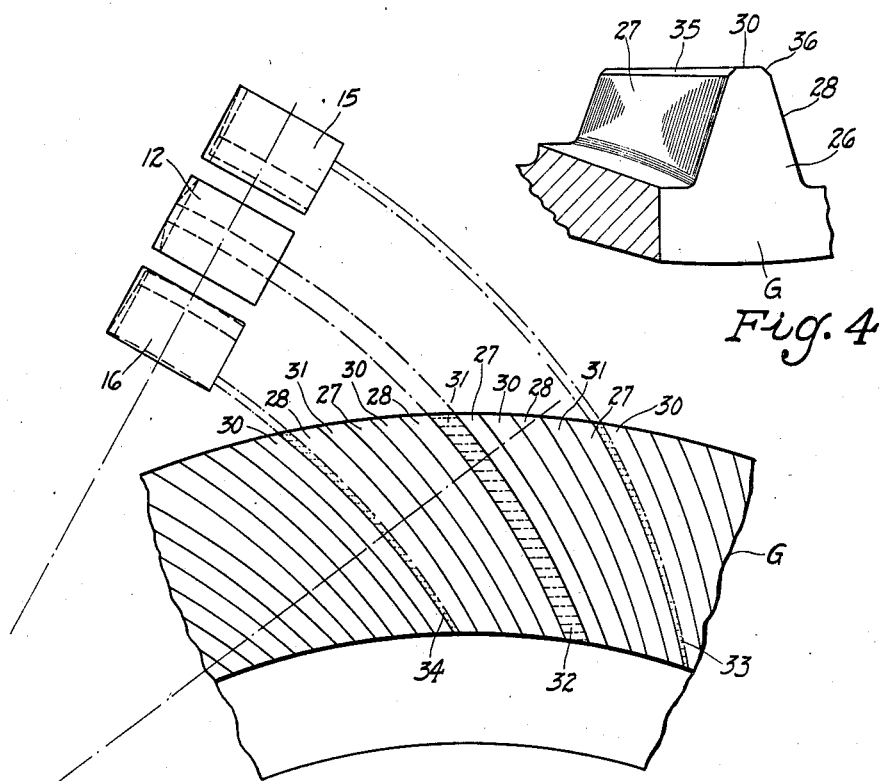
Fig. 4
Fig. 3
Inventor
ERNEST WILDHABER
By [signature]
Attorney Patented Sept. 21, 1943

2,329,804

UNITED STATES PATENT OFFICE 2,329,804

CUTTER FOR PRODUCING GEARS

Ernest Wildhaber, Brighton, N. Y., assignor to Gleason Works, Rochester, N. Y., a corporation of New York Application May 23, 1940, Serial No. 336,797

12 Claims. (Cl. 29—105)

The present invention relates to the production of gears and particularly to the production of longitudinally curved tooth gears such as spiral bevels and hypoid gears.

It is common practice to lap the two members of a pair of spiral or hypoid gears together after they have been cut and hardened. The lapping operation is performed in order to smooth up the tooth surfaces of the gears and to restore the tooth bearing or contact which it is desired to have between their mating tooth surfaces. If no provision is made, however, to reduce the amount of contact between the mating tooth surfaces during the lapping operation, it is usually found that the bearing or contact between the gears, after they have been lapped, is excessively heavy adjacent the tops of the teeth of the gear or larger member of the pair. This heavy bearing seems to be in reality an interference between the teeth and hence is commonly called in the trade a "topline interference." In any event it is objectionable, for gears which have topline interference, are noisy in operation.

It is well known that topline interference can be completely avoided by cutting the pinion or smaller member of a pair of spiral bevel or hypoid gears with a face-mill cutter such as described in the pending application of Frederick E. McMullen, Serial No. 83,118, filed June 2, 1936. This cutter has cutting edges of one pressure angle for cutting the greater portion of the height of the pinion teeth and cutting edges of a smaller pressure angle for relieving the pinion teeth in the dedendum. The cutting edges of smaller pressure angle cut the pinion teeth back near their roots so that contact can not occur in the lapping operation between the pinion teeth and those portions of the mating tooth surfaces of the gear which are adjacent the tips of the gear teeth. Hence when the pinion teeth have been cut with a cutter such as described in the McMullen application, possibility of formation of a topline bearing in the ensuing lapping operation is eliminated.

While the McMullen cutter and process has therefore solved the problem of topline interference, the present process presents some additional advantages. When relief is provided near the roots of the pinion teeth the relief is, in effect, an undercut. Moreover, when the sides of the pinion teeth near the roots of the teeth are generated to a smaller pressure angle, than the greater portion of the height of the teeth, the side surfaces near the roots are likely to be scratchy. In aeroplane drives, this is a drawback for it is known that fatigue failures in gears frequently start along the lines of scratches if there are scratches near the roots of the teeth.

One purpose of the present invention is to enable spiral bevel and hypoid gear pairs to be produced, which may be lapped without introducing topline interference, but which will have the advantage that both gear and pinion teeth have maximum strength, and smooth, well-rounded tooth surfaces at the roots of their teeth.

A further and independent object of the invention is to provide a face-mill gear cutter with which tooth spaces of a tapered gear may be simultaneously roughed or finished and the teeth of the tapered gear chamfered along their lengths at the juncture of the top and side surfaces of the teeth.

Other objects of the invention will be apparent hereinafter from the specification and from the recital of the appended claims.

With the present invention, neither gear nor pinion has teeth relieved near their roots. The dedendum portions of the teeth of both members of the pair can be cut with cutting edges of the same pressure angle as the cutting edges which form the addendum portions of the teeth. Smooth, well rounded tooth surfaces at the roots of the teeth may therefore be provided on both members of the pair and the teeth of both members of the pair may be made free of undercut and therefore of maximum strength. Possibility of formation of topline bearing in the lapping is avoided by chamfering the top edges of the gear teeth along their lengths. When the chamfered gear is run with its mate pinion in the lapping operation, there is no contact between the portion of the tooth surfaces of the gear adjacent the tops of the gear teeth and the portions of the tooth surfaces of the pinion adjacent the roots of the pinion teeth and hence no topline bearing or interference will be caused by reason of the lapping operation. Since the pinion teeth are cut with a face-mill cutter having cutting edges of one pressure angle for their full height, the pinion teeth will be stronger than relieved teeth and also will be substantially free from scratches near the roots of the teeth. The chamfering of the gear teeth at the tops will not affect the strength of these teeth and hence the pair itself produced by the present invention will be stronger and have smoother tooth surfaces than a pair in which the teeth of the pinion have been relieved. The invention has a further advantage that the chamfering of the corners at the top of the gear teeth removes the sharp corners from the teeth which again is of special value particularly in aeroplane drives. In fact, the invention may be employed for chamfering purposes alone where no question of elimination of top-line interference is involved.

The chamfering of the top corners of the teeth of a tapered gear may be done after the teeth have been cut. In this case, a chamfer can be produced simultaneously on opposite sides of the tapering depth tooth spaces of the gear by using a face-mill cutter having side-cutting edges of increased pressure angle, and setting the work to an angle larger than its root angle. I have found, however, that the teeth of a tapered gear can be cut and chamfered simultaneously in the same operation. For this purpose a face-mill cutter is provided which has certain blades for cutting the tooth surfaces and other blades for chamfering the corners of the teeth. The blades for cutting the tooth surfaces are, of course, mounted in the cutter head at the proper radial distance from the axis of the cutter to produce the desired lengthwise tooth curvature. They have the proper pressure angle for producing the desired pressure angles on the sides of the gear teeth. The blades for chamfering the top corners at one side of the gear teeth are mounted at a greater radial distance from the axis of the cutter and the blades for chamfering the top corners at opposite sides of the teeth are mounted at a less radial distance from the axis of the cutter. The chamfering blades, are in fact, mounted so that while the sides of a tooth space are being cut, the corners of opposite sides of the tooth spaces, which are adjacent the tooth space which is being cut, are chamfered. The cutting edges of the chamfering blades are made with considerably greater pressure angles than the pressure angles of the tooth surfaces and ordinarily the pressure angle of the inner chamfering blades is made greater than the pressure angle of the outer chamfering blades. The cutter is, of course, positioned so that the tooth spaces of the gear will be cut to proper depth for their full length. The pressure angles and radial positions of the chamfering edges are selected so that the chamfering edges may follow the tips of the teeth for their full length despite the fact that the tips of the teeth are inclined to the root lines of the teeth due to the taper in height of the teeth from the large to the small ends of the teeth. The chamfering may be done simultaneously with either the rough-cutting operation or the finish-cutting operation.

In the drawings:

Fig. 2 is a fragmentary sectional view through the cutter and illustrating somewhat diagramatically how the cutter is employed;

Fig. 3 is a diagrammatic view further illustrating the operation of cutting a gear according to the present invention; and Fig. 4 is a perspective view of a spiral bevel or hypoid gear tooth such as might be produced by the present invention and which has been chamfered along the top corners of its teeth.

Figure 1:
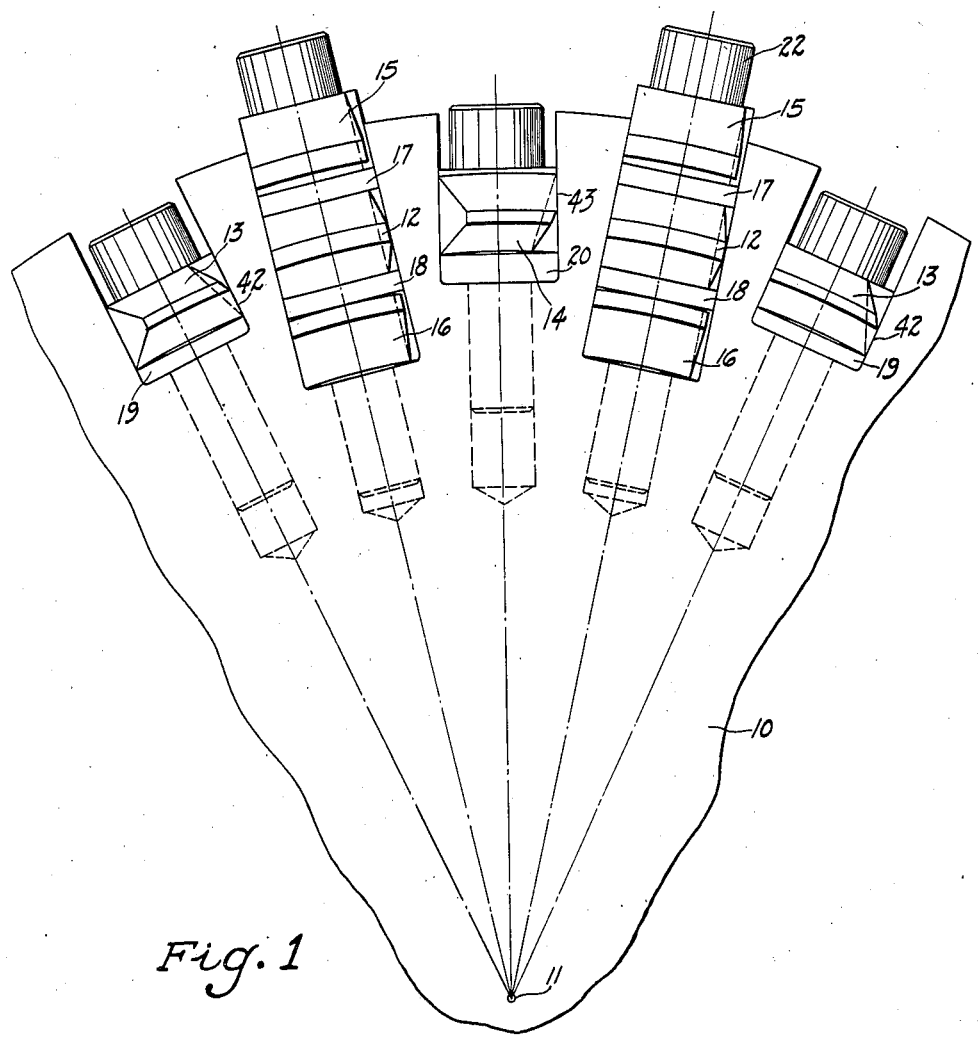
Fig. 1 is a fragmentary plan or face view of a face-mill gear cutter made according to one embodiment of this invention.

The cutter illustrated in the drawings is made to simultaneously rough-cut and chamfer the teeth of a gear. It is of the face-mill type. Its several cutting blades are mounted in the cutter head 10 to extend in the general direction of the axis 11 of the cutter head and so that their cutting portions project axially beyond one side face of the head.

For the purpose of rough-cutting the tooth spaces of a gear, the cutter is provided with alternate bottom and side-cutting blades. In this respect, the cutter may be made similar to the gear roughing cutter described in the co-pending application of Arthur L. Stewart and Allan H. Candee, Serial No. 15,410, filed April 9, 1935. The side-cutting blades may be sharpened to cut on both sides of a tooth space simultaneously, but in the cutter illustrated, alternate side-cutting blades are sharpened to cut on opposite sides, respectively, of the tooth space. The bottom-cutting blades are denoted at 12, the inside cutting blades at 13, and the outside cutting blades at 14.

As in the cutter of the Stewart and Candee application, the bottom-cutting blades of the present cutter are preferably made to project axially beyond the side-cutting blades 13 and 14 and are preferably provided with opposite side surfaces whose pressure angles, or inclination to the axis of the cutter, are less than the pressure angles of corresponding side surfaces of the side-cutting blades.

For chamfering the top edges of the gear teeth, outside and inside chamfering blades 15 and 16, respectively, are provided. In the preferred construction, as illustrated, one outside and one inside chamfering blade are mounted in the same slot as each bottom-cutting blade 12. The two chamfering blades 15 and 16 are positioned in each slot at opposite sides of the bottom-cutting blade. The two chamfering blades 15 and 16 mounted in a slot are, moreover, spaced at either side from the bottom-cutting blade of that slot by shims or parallels 17 and 18, respectively, so that when a bottom-cutting blade 12 is cutting in one tooth space of a gear blank, the chamfering blades 15 and 16 will be cutting on opposite sides of tooth spaces at either side of the tooth space in which the bottom-cutting blade is operating. Shims 19 and 20, respectively, are provided in the slots which receive the inside and outside cutting blades 13 and 14, respectively, so that the side-cutting blades may be adjusted to cut a tooth space of the desired width. The various blades are secured in the several slots of the cutter head by bolts 22 which thread into the cutter head.

Figs. 2 and 3 illustrate how the combined roughing and chamfering cutter operates. G denotes a tapered gear which is to be cut and chamfered. The tooth spaces of this gear are denoted at 25 and its teeth at 26. Opposite sides of the teeth are designated at 27 and 28, respectively, while the tips of the teeth are denoted at 30 and the bottoms of the tooth spaces at 31. The teeth and tooth spaces of the gear taper in height from end to end, and of course, the tips 30 of the teeth are inclined to the bottoms 31 of the tooth spaces.

For cutting a gear of the "Formate" (non-generated) type, the cutter is rotated on its axis 11 and simultaneously fed into the gear blank to cut teeth of the proper depth. The bottom-cutting blades 12 of the cutter cut in the bottoms of a tooth space as the cutter feeds into depth and the side-cutting blades 13 and 14 form the sides of the tooth space. The chamfering blades 15 and 16 do not come into action until after considerable of the depth of a tooth space has been cut. Then as the cutter continues to revolve in engagement with and to be fed into the blank, the chamfering blades 15 and 16 cut on the opposite sides 27 and 28, respectively of the tooth spaces which lie adjacent to and at opposite sides, respectively, of the tooth space in which the bottom-cutting blades 12 and side-cutting blades 13 and 14 are operating. In this way, the corners formed at the junctures of the opposite side surfaces 27 and 28 with the tips 30 of teeth adjacent the tooth space that is being cut, are chamfered.

Fig. 3 illustrates diagrammatically the paths of bottom and inside and outside chamfering blades in the cutting of a gear G. The blades are shown in full lines after they have passed through the cut. The shaded portion 32 denotes the cut taken in the bottom 31 of a tooth space by the bottom-cutting blade and the shaded portions 33 and 34 denote, respectively, the cuts taken on the opposite corners of teeth 26 by the opposite chamfering blades 15 and 16. When the tooth space has been cut to full depth the cutter is withdrawn and the blank is indexed.

The bottom-cutting blades 12 are preferably sharpened with a hook as described in the Stewart and Candee application above mentioned. The chamfering blades 15 and 16 may also be sharpened with hooks. In this way the front faces of the bottom-cutting blades and of the chamfering blades can be aligned with one another and sharpened simultaneously. Hence the sharpening operation on the present cutter may be performed as readily as the sharpening of the Stewart and Candee cutter.

It will be noted that the chamfering blades 15 and 16 have outside and inside cutting edges 40 and 41, respectively, which are of greater pressure angle or inclination to the axis 11 of the cutter than the corresponding side-cutting edges 42 and 43, respectively, of the side-cutting blades 13 and 14. It will be noted further that the inside cutting edges 41 of the inside chamfering blades 16 have a greater pressure angle than the outside cutting edges 40 of the outside chamfering blades 15. The tangent of the pressure angle of the cutting edge of the inside chamfering blades is ordinarily more than 50% larger than tangent of the pressure angle of the cutting edge of the outside chamfering blades and ordinarily the pressure angles of the inside chamfering edges is more than twice as large as the pressure angles of the inside side-cutting edge 42 of the blades 13.

The radial positions of the chamfering blades and the pressure angles of their side-cutting edges are so related to one another and to the root and face angles of the gear which is to be cut that the chamfering edges 41 which cut the corners of the convex sides of the gear teeth and the chamfering edges 40 which cut the corners at the concave sides of the gear teeth may follow the teeth along their full length, despite the taper in depth of the teeth, and chamfer the corners of the teeth along their full length. The pressure angles to be used on the chamfering blades may be computed from this requirement, or may be determined experimentally.

Fig. 4 shows a tooth of a gear produced according to the present invention. 35 and 36 denote the chamfered top corners at opposite sides of the tooth.

While the invention has been described in connection with a cutter for simultaneously roughing and chamfering the teeth, it will be understood that the invention is also applicable where it is desired to chamfer the teeth simultaneously with the finish-cutting of the teeth, that is, after the teeth have been roughed out. Thus, the well-known "single cycle" type of gear cutter, such as illustrated in the U. S. patent to McMullen, No. 2,125,943 of August 9, 1938 may be employed with modification for practicing the present invention by adding or substituting in some of the blade slots, which carry stocking blades, chamfering blades which are of the proper pressure angle and set to the proper radius to chamfer the roughed teeth of a gear simultaneously with the cutting of those teeth. The combined finishing and chamfering cutter may then be operated in a way similar to the cutter illustrated in the McMullen et al. patent, that is, the combined cutter may be adjusted to full depth and rotated in engagement with a roughed gear to finish-cut and chamfer teeth of the gear on each revolution of the cutter, the gear being indexed when the gap in the cutter is abreast of the blank.

It will also be understood that while the invention has been described specifically in connection with the use of a cutter having a finite number of blades, it is also applicable where the cutter is in the form of a grinding wheel which is in effect a cutter having an infinite number of cutting edges or blades. The term cutter as used in the specification and claims is intended, therefore, to include also a grinding wheel.

In general it may be said that while the invention has been illustrated in connection with a particular embodiment thereof, it will be understood that the invention is capable of various further modifications and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter having a plurality of blades for cutting the side surfaces of the teeth of a gear, and a plurality of blades for chamfering the top edges of the teeth, the latter blades being arranged at a different radial distance from the axis of the cutter from the first named blades and being arranged to cut in a different tooth space from the first named blades.

2. A face-mill gear cutter having a plurality of blades for cutting the side surfaces of the teeth of a gear and a plurality of blades for chamfering the top edges of the teeth, the latter blades being arranged at different radial distances from the axis of the cutter from the first blades and having opposite side-cutting edges whose inclination to the axis of the cutter is greater than the inclination of corresponding side-cutting edges of the first blades and being arranged to cut in different tooth spaces from the first named blades.

3. A face-mill gear cutter having a plurality of blades for chamfering the top edges of longitudinally curved tooth gears, said blades having side-cutting edges whose inclination to the axis of the cutter is greater than the pressure angles of the side surfaces of the gear to be cut, and said blades being arranged at a radial distance from the axis of the cutter which is different from the radius of lengthwise curvature of the teeth of the gear to be cut.

4. A face-mill gear cutter having a plurality of blades for cutting the opposite side surfaces of the teeth of a gear and a plurality of blades for chamfering the top edges of the teeth, the latter blades being arranged to cut in a different tooth space of the gear from the first-named blades, certain of the chamfering blades having side-cutting edges for chamfering the top corners at one side of the teeth of the gear and being arranged at a greater radial distance from the axis of the cutter than the first named blades, and others of the chamfering blades having side-cutting edges for chamfering the top corners at the opposite side of the teeth of the gear and being arranged at a lesser radial distance from the axis of the cutter than the first named blades, both types of chamfering blades having side-cutting edges whose inclination to the axis of the cutter is greater than the inclination of the corresponding side-cutting edges of the first named blades.

5. A face-mill gear cutter having a plurality of blades for cutting the opposite side surfaces of the teeth of a gear and a plurality of blades for chamfering the top edges of the teeth, certain of the chamfering blades having outside cutting edges and being arranged at a greater radial distance from the axis of the cutter than the first named blades, and others of the chamfering blades having inside cutting edges and being arranged at a lesser radial distance from the axis of the cutter than the first named blades, the said outside and inside cutting edges of the chamfering blades being both inclined at a greater angle to the axis of the cutter than the corresponding side-cutting edges of the first named blades, and the outside chamfering edges being less inclined to the axis of the cutter than the inside chamfering edges.

6. A face-mill gear cutter having a plurality of side-cutting blades, a plurality of bottom-cutting blades, and a plurality of chamfering blades, the bottom-cutting blades alternating with the side-cutting blades around the periphery of the head and projecting axially beyond the side-cutting blades and having opposite side edges of smaller pressure angle than corresponding edges of the side-cutting blades, the chamfering blades being radially aligned with the bottom-cutting blades, certain of the chamfering blades having outside cutting edges, and others of the chamfering blades having inside cutting edges, the chamfering blades with outside cutting edges being positioned radially at a greater distance from the axis of the cutter than the bottom-cutting blades, and the chamfering blades with inside cutting edges being positioned radially of the axis of the cutter at a less distance than the bottom-cutting blades, the outside and inside cutting edges of the chamfering blades being inclined to the axis of the cutter at a greater angle than the corresponding side-cutting edges of the side-cutting blades, and the inclination of the inside cutting edges of the chamfering blades being greater than the inclination of the outside cutting edges of the chamfering blades.

7. A face-mill gear cutter having a plurality of blades for chamfering the top edges of longitudinally curved tooth gears, certain of the blades having outside cutting edges for chamfering one side of the teeth of the gear at the top thereof, and other blades having inside cutting edges for chamfering the opposite side of the teeth of the gear at the top thereof, both said outside and said inside cutting edges being of greater inclination of the axis of the cutter than the pressure angle of the sides of the teeth to be chamfered, and the outside chamfering blades being mounted in the cutter at a sufficiently greater radial distance from the axis of the cutter than the inside chamfering blades to operate on one side of a tooth space that is spaced from the tooth space on whose side the inside blades operate.

8. A face-mill gear cutter having a plurality of blades for chamfering the top edges of longitudinally curved tooth gears, certain of said blades having outside cutting edges for chamfering one side of the teeth of a gear at the tops thereof, and other blades having inside cutting edges for chamfering the opposite sides of the teeth at the tops thereof, both said inside and said outside cutting edges being inclined to the axis of the cutter at an angle greater than the pressure angles of the side tooth surfaces of the gear to be chamfered, and the outside and inside chamfering blades being mounted radially at different distances from the axis of the cutter head so that the outside blades operate on one side of a tooth space that is spaced from the tooth space on whose side the inside blades operate.

9. A face-mill gear cutter having a plurality of blades for chamfering the top edges of longitudinally curved tooth gears, certain of the blades having outside cutting edges for chamfering one side of the teeth of a gear at the tops thereof, and other blades having inside cutting edges for chamfering the opposite sides of the teeth at the tops thereof, the inside chamfering edges being inclined at a greater angle to the axis of the cutter than the outside chamfering edges, and both the inside and outside chamfering edges being inclined to the axis of the cutter at angles greater than the pressure angles of the side tooth surfaces of the gear to be chamfered, the outside and inside chamfering blades being mounted radially at different distances from the axis of the cutter head so that the outside blades operate on one side of a tooth space that is spaced from the tooth space on whose side the inside blades operate.

10. A face-mill gear cutter having a plurality of blades for cutting the opposite side surfaces of the teeth of a gear and a plurality of blades for chamfering the top edges of the teeth, the latter blades being arranged to cut in different tooth spaces of the gear from the first named blades, certain of the chamfering blades having side cutting edges for chamfering the top corners at one side of the teeth of a gear and being arranged at a greater radial distance from the axis of the cutter than the first named blades, and others of the chamfering blades having side cutting edges for chamfering the top corners at the opposite side of the teeth of the gear and being arranged at a lesser radial distance from the axis of the cutter than the first named blades.

11. A face-mill gear cutter having a plurality of blades for cutting the opposite sides of the teeth of a gear and a plurality of blades for chamfering the top edges of the teeth, certain of the chamfering blades having side cutting edges for chamfering the top corners at one side of the teeth of the gear and being arranged at a greater radial distance from the axis of the cutter than the first named blades and other of the chamfering blades having side cutting edges for chamfering the top corners at the opposite side of the teeth of the gear and being arranged at a lesser radial distance from the axis of the cutter than the first named blades, whereby the two groups of chamfering blades may operate in tooth spaces lying at opposite sides, respectively, of the tooth space in which the first named blades operate, both groups of chamfering blades having their side edges inclined to the axis of the cutter at a greater angle than the corresponding side edges of the first named blades, and the chamfering blades which are arranged at the greater radial distance from the axis of the cutter having side-cutting edges of smaller inclination to the axis of the cutter than the chamfering blades which are arranged at the lesser radial distance from the axis of the cutter.

12. A face-mill gear cutter having a plurality of blades for chamfering the top edges of the teeth of longitudinally curved tooth gears, certain of said blades having outside cutting edges for chamfering one side of the teeth at the tops thereof, and others of said blades having inside cutting edges for chamfering the other sides of said teeth at the tops thereof, both said inside and said outside chamfering edges being inclined to the axis of the cutter at angles greater than the pressure angles of the side tooth surfaces to be chamfered, said outside chamfering edges being inclined to the axis of the cutter at an angle less than the inside chamfering edges, and said outside chamfering edges being arranged at a greater radial distance from the axis of the cutter than said inside chamfering edges and being spaced from said inside chamfering edges a sufficient radial distance to operate on the concave side of a tooth space of the gear to be chamfered that is spaced from the tooth space on the convex side of which the inside chamfering blades operate.

ERNEST WILDHABER.